United States Patent [19]

Li et al.

[11] Patent Number: 4,835,651
[45] Date of Patent: May 30, 1989

[54] LOSS-OF-POTENTIAL SUPERVISION FOR A DISTANCE RELAY

[75] Inventors: Hung J. Li; James P. Garrity, both of Coral Springs, Fla.

[73] Assignee: Westinghouse Electric Corp., Pittsburgh, Pa.

[21] Appl. No.: 177,666

[22] Filed: Apr. 5, 1988

[51] Int. Cl.⁴ .............................................. H02H 7/26
[52] U.S. Cl. ........................................ 361/68; 361/79
[58] Field of Search ....................... 361/62, 63, 64, 65, 361/66, 67, 68, 79, 80

[56] References Cited

U.S. PATENT DOCUMENTS 3,777,215 12/1973 D'Esopo .............................. 361/65
4,479,084 10/1984 Ogawa et al. ......................... 361/66
4,745,512 5/1988 Hampson ............................. 361/65

Primary Examiner—A. D. Pellinen
Assistant Examiner—Jeffrey A. Gaffin
Attorney, Agent, or Firm—B. R. Studebaker

[57] ABSTRACT

Loss-of-potential supervision for a distance relay controlling a circuit breaker in a poly-phase electric power transmission system is provided by blocking circuit breaker trip signals in the presence of a low voltage condition and the absence of an increase in current of more than a predetermined amount. Overblocking is prevented for weak feed conditions, a circuit breaker closing on a fault, transients induced by replacement of a fuse, and sequencing caused by tripping of a remote breaker.

10 Claims, 2 Drawing Sheets

LOSS-OF-POTENTIAL SUPERVISION FOR A DISTANCE RELAY

BACKGROUND OF THE INVENTION

1. Field of the Invention

This invention relates to distance relays used to detect the presence of faults in electric power transmission systems and to generate trip signals for circuit breakers in response to faults within protection zones of the relay. In particular, the present invention is directed to a distance measuring relay of the type having loss-of-potential protection which prevents false tripping of the circuit breakers in response to failure of the voltage signal used by the relay.

2. Background Information

The distance relay measures the ohmic value from the relay location to a fault point in an electric power transmission line by using the voltage/current information at the relay location. The current for these measurements is provided by current transformers connected to the transmission line, while the voltage information is obtained from potential transformers. The relay determines the apparent impedance, $Z_{app}$, by dividing the voltage by the current. The farther the fault is from the relay the greater will be the apparent impedance. The relay is preset to "reach", that is to generate a trip signal for faults, out to a balance-point $Z_c$. During normal service conditions, the voltage is high and the current is low. Whenever the apparent impedance, $Z_{app}$, is higher than the distance relay setting $Z_c$, the relay will be in a restraint mode. During a fault, the power system voltage collapses, and the fault current is directly related to the fault distance. The fault current is usually higher than the load current, thus $Z_{app}$ is less than Zc for a fault within the protection zones of the relay. Under these conditions, the relay will operate and generate a trip signal for the circuit breaker which will interrupt current to the fault.

The voltages used by the distance relay are provided by potential transformers. In practice, fuses are provided in the voltage circuit and situated on the line side of the relay for protecting the voltage transforming devices. One or more of the fuses may blow out for some reason and cause a loss-of-potential condition to the relay voltagate circuit. Under these conditions, the relay receives a zero or unbalanced voltage which is similar to a severe system fault condition and the relay responds with an undesirable trip signal.

Various approaches have been devised for dealing with this loss-of-potential condition, such as voltage comparison, and current supervision. The disadvantages of the solutions to date are either complication of the relay or difficulty in setting parameters, and not being able to detect a three-phase fuse failed condition.

In the prior art voltage comparison approach, the voltages are compared with a reference voltage to generate a signal which blocks the trip if the voltages used for determining impedance do not equal the reference voltage. The disadvantages of this approach are that it requires a separate voltage source/device for the reference voltage and the failure of the reference voltage fuse will also disable the distance relay.

Another voltage comparison approach utilizes a voltage relay which senses a voltage difference between the two ends of the fuse. The voltage relay operates when the fuse blows to block the trip signal. The disadvantages of this approach are that it requires an additional voltage relay, and a racing problem can occur between the operation of the voltage relay and the operation of the distance relay when a fuse blows. That is, a false trip may be initiated before the voltage relay can block the trip.

Another solution to the loss-of-potential condition in a distant relay utilizes an over current relay which operates when current is higher than its preset level to unblock the trip signal. The signal from the overcurrent relay is anded with the trip signal generated from $Z_{app}$. Thus, in a loss-of-potential situation, the current will be below the setting of the overcurrent relay and the false trip signal is blocked. The disadvantages of this approach are that it requires an over current relay and the over current relay has to be set higher than the maximum load current but lower than the minimum fault current. This setting criteria can be difficult in some applications.

Yet another approach to the problem utilizes sequence component quantities. More specifically, the zero sequence voltages and currents are used. The zero sequence voltage and negated zero sequence current are anded and applied as a negated input to an AND gate together with the TRIP signal generated as a function of the apparent impedance. Under normal operating conditions, both the zero sequence current and zero sequence voltage are zero and the trip signal is unblocked. For a single phase to ground fault or a phase to phase to ground fault, both the zero sequence voltage and the zero sequence current have nominal values, and again, the trip signal is unblocked. For two-phase or three-phase faults both the zero sequence current and voltage are zero and again the trip signal will be generated. For a blown fuse in one or two phases of the potential measuring device the zero sequence voltage will have a nominal value but the zero sequence current will be zero and, in this instance, the trip signal will be blocked. However, with all three phases blown, the zero sequence voltage is also zero and a false trip signal can be generated.

Accordingly, there is a need for a protective relay which reliably prevents tripping of a circuit breaker in a power transmission line in response to a loss-of-potential condition.

In addition, there is a need for such a protective relay which does not overblock and prevent a bona fide trip.

SUMMARY

These and other needs are satisfied by the invention which is directed to a protective relay which recognizes that when a fault occurs in a power transmission system, the voltage drops and the current increases rapidly, while in a loss-of-potential incident, the voltage in the faulted phase or phases drops while the currents are not affected. Thus, more particularly, in accordance with the invention a loss-of-potential condition is identified and tripping of the breaker is precluded, by blocking a trip signal when at least one voltage is at least a predetermined amount below its normal value in the absence of any current, including the zero sequence current, which has increased a predetermined amount in a most recent selected time interval. As applied to a digital relay where the currents and voltages are sampled periodically during each power cycle to generate digital current and voltage signals, a ΔI signal is generated indicating whether any of the currents have increased by the predetermined amount between successive digital samples.

In order to preclude generation of a false trip signal by transients induced by replacement of a blown fuse, blocking of a trip signal is extended for a selected time interval, 500 milliseconds in the exemplary system, after the condition for setting the block have terminated. The ΔI signal used by the invention is sensitive enough to detect a fault with a large remote zero sequence current component. Hence a long time delay, typically 500 milliseconds, is not required to allow for tripping of a remote breaker to preclude overblocking as in prior art LOP protection systems. However, a nominal, for example, a one-half power cycle delay is imposed in generating the blocking signal to preclude setting the block signal for 500 milliseconds should the low voltage condition be detected before the incremental increase in current in the case of the remote fault.

In addition, the invention includes logic which prevents generation of a indication of a loss-of-potential condition in the instance where a fault is not in the protection zone of the relay and the relay reverts to the restraint mode resulting in loss of the ΔI signal. To preclude overblocking in this condition, logic means set by the ΔI signal in the presence of a low voltage signal prevents blocking of a trip signal for as long as any voltage remains the predetermined amount below its normal value, even though no current has increased by the predetermined amount since the last sample.

BRIEF DESCRIPTION OF DRAWINGS

A full understanding of the invention can be gained from the following description of the preferred embodiment when read in conjunction with the accompanying drawings in which.

DESCRIPTION OF THE PREFERRED EMBODIMENTS

Figure 1:
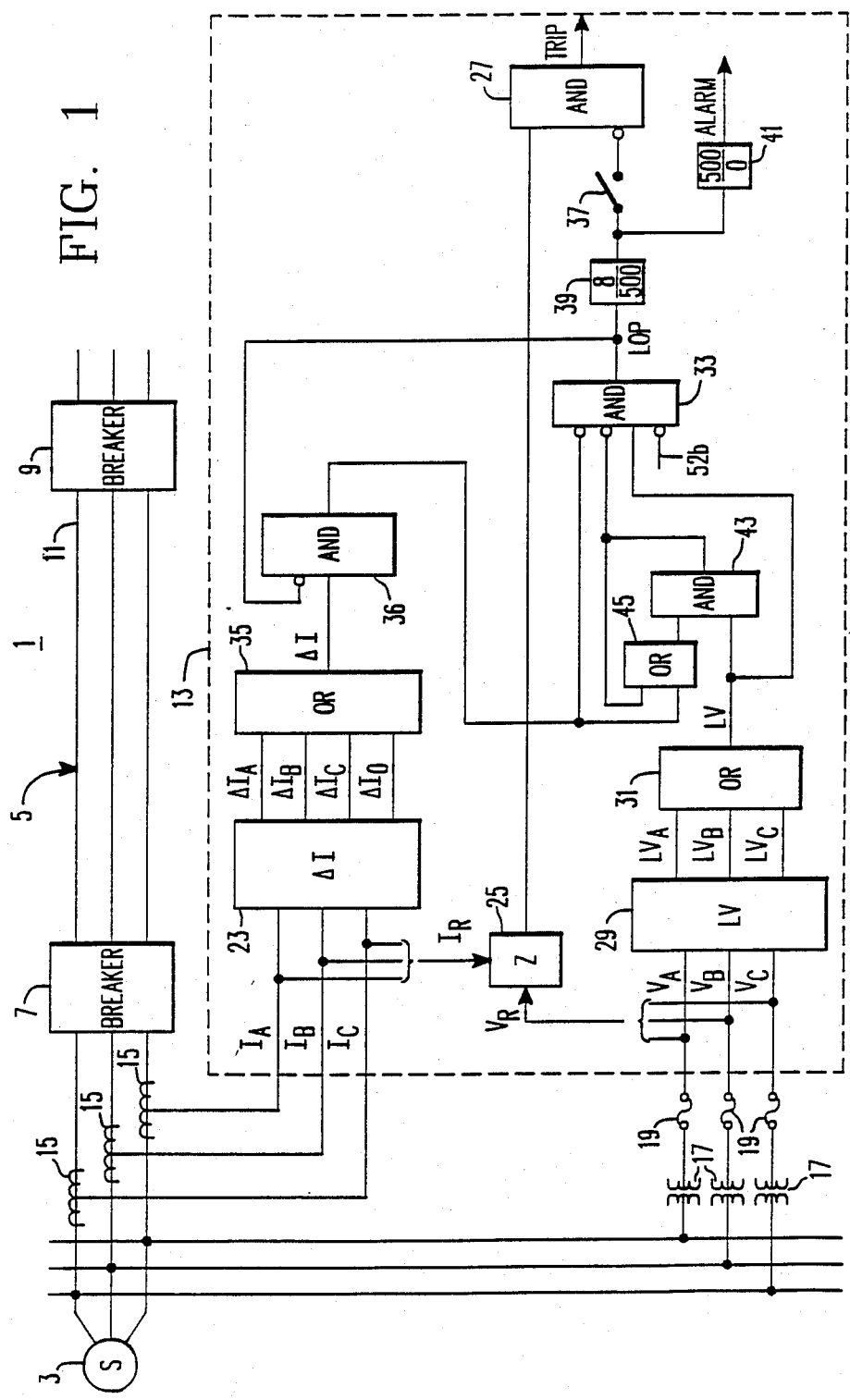
FIG. 1 is a diagram of an electric power transmission system including a distance measuring type protective relay incorporating the invention.

FIG. 1 illustrates application of the invention to an electric power transmission system which includes a three phase a-c source 3 supplying power to a three-phase transmission line 5. A circuit breaker 7 is provided in the line 5 adjacent to the source 3, and another circuit breaker 9 protects the remote end 11 of the line 3. The remote end 11 of line 5 may be connected to another three-phase source (not shown).

Operation of the circuit breaker 7 is controlled by distance relay 13 which, in accordance with the invention, is a microprocessor based device. Thus, the logical functions shown in FIG. 1 as being performed by the distance relay 13 are executed by software. Alternatively, the indicated functions can be carried out by discrete circuit elements.

Instantaneous measurements of each of the three-phase currents $I_A$, $I_B$ and $I_C$ of the power transmission system are supplied to the distance relay 13 by current transformers 15. Similarly, the instantaneous values of the three-phase to ground voltages $V_A$, $V_B$ and $V_C$ are provided to the relay 13 by potential transformers 17 which are protected by fuses 19. The distance relay 13 utilizes these currents and voltages to detect faults in the transmission line 5 and to generate trip signals for the circuit breaker 7 if the detected fault is within the protection zone of the relay.

Figure 2:
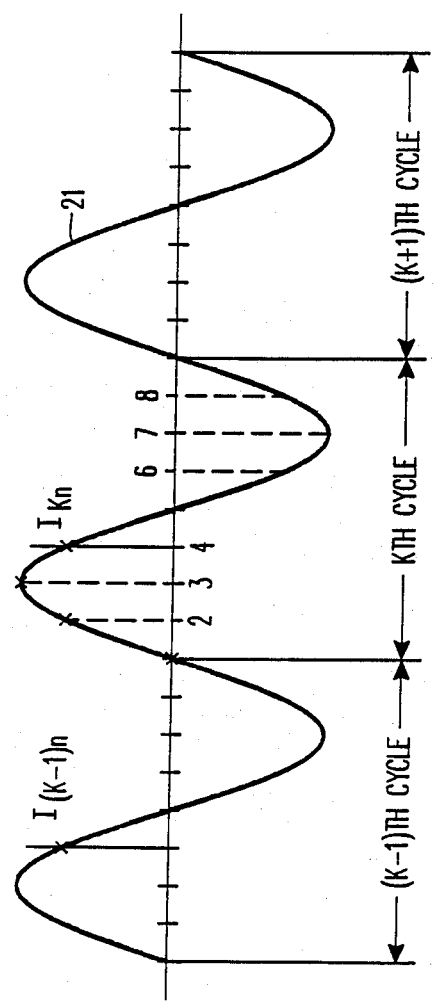
FIG. 2 is a waveform diagram indicating the manner in which the currents (and voltages) of the electric power transmission system of FIG. 1 are digitized for use by the protective relay incorporating the invention.

One method of detecting a fault in the transmission system 1 is to monitor the measured currents for disturbances. As shown in FIG. 2, each of the current waveforms 21 is sampled synchronously eight times per cycle. A ΔI value is continually calculated for each current by subtracting from the value of the present sample, the value of the corresponding sample from the previous cycle. Thus, as shown in FIG. 2, where $I_{Kn}$ equals the nth sample in the Kth cycle:

$$\Delta I = I_{Kn} - I_{(K-1)n}$$

The value of ΔI is continually calculated for each phase of the three phase transmission line and for the zero sequence current $3I_o$, which is the phasor sum of the three phase currents. A value of ΔI which exceeds preset limits is used as an indication of a fault. By way of example, a value of ΔI for any phase current which exceeds 1.0 ampere and represents at least a 12.5% change in the value of that sample for the present cycle over the value of the corresponding sample for the previous cycle, or a change of 0.5 ampere in the zero sequence current is taken in the exemplary relay, as an indication of a fault.

In the background mode of operation, the distance relay 13 continually calculates the value ΔI for each of the phase currents $I_A$, $I_B$ and $I_C$ and for the zero sequence current $I_0$ as indicated at 23. If ΔI for any of these currents exceeds the limit on absolute magnitude, and in the case of the phase currents, the limit in percentage change, the relay transfers from the background mode to a fault mode. The exemplary relay also monitors the voltages for any fault disturbances, and alternatively transfers to the fault mode if any of the voltages change by a preselected amount from one sample to the next. In the fault mode, the complex impedances of the power line 5 at the breaker 7 are computed from the measured line currents and voltages, and compared with a predetermined reach characteristic at 25 in a known manner. If any of the apparent impedances are within the selected reach characteristic, a logical ONE is applied to an AND function 27. If at the same time, a logical ZERO is applied to the other, negated input to the AND function 27, a TRIP signal is generated. The complex impedance Z is computed for each phase of the three phase transmission line 5. Thus, a TRIP signal can be generated for one or more phases.

Other functions (not shown) within the relay 13 determine the type of fault, phase to ground, phase-to-phase, phase-to-phase-to-ground or three phase, and operate the circuit breaker 7 to interrupt the appropriate phase or phases of the transmission line 5 in a known manner.

The distance relay 13 also monitors each phase to ground voltage, $V_A$, $V_B$, $V_C$ at 29, and generates a low voltage signal, $LV_A$, $LV_B$, or $LV_C$, if a predetermined drop in the associated voltage is detected. In the exemplary system, the low voltage signals are generated if the associated voltage drops by seven volts or more and this represents a 12.5% or more change in the voltage from a preset normal value. These low voltage signals are currently used by the relay 13 to detect close-in faults, that is faults close to the location of the current transformers 15 and voltage transformers 17.

Thus, it can be seen that the signals ΔI and LV are already available in the exemplary microprocessor based distance relay 13. The present invention takes advantage of the availability of these signals to provide a rapid, reliable indication of a loss-of-potential condition. More specifcally, the invention is based on the realization that if the voltage drops significantly without a change in current, there has most likely been a loss-of-potential (LOP), such as would occur if one or more of the fuses 19 were to be blown. Accordingly, as shown in FIG. 1, the low voltage signals for each phase are ORed at 31 and applied to an AND gate 33. The ΔI signals are ORed at 35 and applied to the AND gate 33 through another AND gate 36 connected to a negated input of AND gate 33. Thus, if any of the voltages drop by more than the preset limit while all of the currents remain within their limits, the output of AND 33 goes high, and with the switch 37 closed a TRIP signal is blocked through the negated input to AND 27. A feedback signal from AND 33 applied to a negated input to AND 36 seals in the LOP signal until the LV returns to normal. This precludes a subsequent fault from overriding the LOP signal.

To preclude generation of a false trip signal by transients induced by replacement of a blown fuse, a time delay 39 with a 500 millisecond delay in drop out is inserted between AND 33 and AND 27. This delay will extend blocking of a trip signal for 500 milliseconds after the loss-of-potential condition is corrected.

While the ΔI signals are more sensitive than the $3I_0$ signal used in the prior art $3V_0$ and not $3I_0$ logic, so that the present invention will not mistake a fault with a large remote $I_0$ source as a loss-of-potential condition, the delay 39 is provided with a short delay, such as for example one-half power cycle (approximately 8 milliseconds), to preclude setting of the block signal for 500 milliseconds should the LV condition be detected before the ΔI.

In addition to blocking the TRIP signal generated by the AND gate 27, the LOP signal also generates an alarm. In order to eliminate generation of an alarm on temporary excursions, a delay 41 with 500 milliseconds in pickup is provided. The alarm signal drops out immediately upon termination of the LOP signal.

If there is a true fault so that at least one of the ΔI and one of the LV signals are present, but the fault is outside the zones of protection of the relay 13, the Z unit 25 will not generate a TRIP signal. Under these circumstances, after three cycles, the relay 13 will go back to the background mode of operation. If the remote breaker does not TRIP, the fault is still present. However, the ΔI signals will all go to zero because, although the current is still high, it will not be changing sufficiently rapidly in value to generate a ΔI signal. Under these circumstances, it can be appreciated that an LOP signal could be generated. In order to prevent this overblocking condition, the output of OR gate 35 is applied to an AND gate 43 through an OR gate 45. The output of the AND gate 43 is fedback as an additional input to the OR gate 45. This forms a sealing circuit so that once a ΔI and an LV signal are generated, a logical one is applied to AND gate 33 through a negated input to preclude generation of an LOP signal. AND gate 43 is reset upon clearance of the fault and termination of the LV signals.

Another instance where overblocking could occur is where a circuit breaker controlled by the relay 13 recloses onto a fault in a system where the potential transformer is on the line side of the breaker. Under these circumstances, an LV but no ΔI signal would be generated to generate an LOP signal in AND gate 33. In order to prevent this, a break contact 52b on a relay energized by a line side current is connected through a negated input to AND 33. Thus, with the circuit breaker open, the LOP signal is inhibited, and the time delay in pickup of the relay is sufficient to generate a trip signal to reopen the breaker.

The following truth table illustrates performance of the loss-of-potential supervision features of the distance relay 13.

| | TRUTH TABLE | | | | | | | |
|---|---|---|---|---|---|---|---|---|
| Condition | 52b | LV | ΔI | OR-45 | AND-43 | LOP AND-33 | Z | Trip AND-27 |
| 1. Normal service | 0 | 0 | 0 | 0 | 0 | 0 | 0 | 0 |
| 2. φG/φφG faults | 0 | 1 | 1 | 1 | 1 | 0 | 1 | 1 |
| 3. φφ/3φF faults | 0 | 1 | 1 | 1 | 1 | 0 | 1 | 1 |
| 4. LOP, 1 or 2 fuse failed | 0 | 1 | 0 | 0 | 0 | 1 | 1 | 0 |
| 5. LOP, all 3 fuses failed | 0 | 1 | 0 | 0 | 0 | 1 | 1 | 0 |
| 6. Line side pot. breaker open | 1 | 1 | 0 | 0 | 0 | 0 | 0 | 0 |
| 7. Reclosing on no fault | 0 | 0 | 0 | 0 | 0 | 0 | 0 | 0 |
| 8. Reclosing on fault | 0 | 1 | 1 | 1 | 1 | 0 | 1 | 1 |
| 9a. Forward external fault | 0 | 1 | 1 | 1 | 1 | 0 | 1 | 1 |
| 9b. Back to background mode | 0 | 1 | 0 | 1 | 1 | 0 | 1 | 1 |
| 9c. Adjacent BKR. tripped | 0 | 0 | 0 | 1 | 0 | 0 | 0 | 0 |

Condition 2 in the above Table is a single phase to ground fault or a phase-to-phase-to-ground fault, while condition 3 represents two and three phase-to-phase faults. The Truth Table shows that the relay produces an LOP block only on a loss-of-potential condition, and will not produce LOP blocks on faults or on other system conditions. Thus the invention solves all of the existing problems with loss-of-potential systems and provides the following advantages:
1. there are no current setting problems;
2. all kinds of fuse failure conditions, including a three-phase blown condition are detected;
3. more security is provided in that the time delay for an LOP condition is reduced to 8 millisecond or one power cycle;
4. provides more dependability in that the ΔI status is rechecked; and
5. overblock conditions are eliminated.

The invention is easily implemented in those microprocessor-based distance relays in which the ΔI and LV signals are already generated for other purposes and therefore are readily available. While in the exemplary system, the ΔI and LV limits of the signals already created are utilized, it is clear that such signals utilizing other limiting values could be substituted, although this would NOT TAKE advantage of the signals already available.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed:

1. In a protective relay having means generating a trip signal for a circuit breaker in an a-c electric power transmission system in response to a fault within a protection zone of the breaker, means measuring power transmission system currents and voltages, and blocking means responsive to at least one voltage which is a predetermined amount below a normal value, and to the absence of any current which has increased by a predetermined amount in a most recent preselected time interval, for blocking said trip signal to thereby preclude tripping the circuit breaker in response to a loss-of-potential condition.

2. In the protective relay of claim 1 wherein said blocking means includes delay means preventing said blocking means from blocking a trip signal until at least one voltage remains at least said predetermined amount below said normal voltage and the absence of a current which has increased by said predetermined amount in the most recent preselected time interval prevails for a preselected delay interval.

3. in the protective relay of claim 2 wherein the preselected delay interval of the delay means is about one-half power cycle of the power transmission system.

4. In the protective relay of claim 3 wherein said delay means includes means for extending blocking of a trip signal by said blocking means for a designated interval after at least one voltage has been said predetermined amount below said normal value in the absence of any current which has increased by said predetermined amount in a most recent preselected time interval.

5. In the protective relay of claim 1 including means set by at least one current increasing said predetermined amount in a most recent preselected time interval while at least one voltage is said predetermined amount below said normal voltage for preventing said blocking means from blocking a trip signal, such means remaining set even though no current has increased by said predetermined amount in a subsequent most recent preselected interval as long as at least one voltage remains said predetermined amount below said normal voltage.

6. A protective relay for generating a trip signal for a circuit breaker in an a-c electric power transmission system in response to a fault, comprising:

means generating during each cycle of an a-c electric power transmission system a plurality of digital samples of each of the a-c electric power transmission system phase voltages, phase currents and zero sequence current;

trip generating means responsive to said digital samples for generating a trip signal under selected conditions, LV means responsive to said digital samples for generating an LV signal having a first value when at least one of said a-c electric power transmission system phase voltages is at least a predetermined amount below a normal voltage, and having a second value otherwise, ΔI means responsive to said digital samples for generating a ΔI signal having a first value when none of the a-c electric power transmission system phase currents or zero current increase by at least a preselected amount between the most recent digital sample and the next most recent digital sample, first logic means responsive to an LV signal of the first value and a ΔI signal of the first value for generating a loss-of-potential (LOP) signal; and second logic means responsive to said LOP signal for blocking said trip signal.

7. The protective relay of claim 6 including delay means delaying response of said second logic means to said LOP signal for about one-half power cycle.

8. The protective relay of claim 6 including delay means between said first and second logic means which continues to apply a signal to said second logic means to block said trip signal for a predetermined delay interval after said LOP signal is no longer generated by the first logic means.

9. The protective relay of claim 8 wherein said delay means also delays response of the second logic means to said LOP signal for about one-half power cycle.

10. The protective relay of claim 9 including means responsive to an LV signal of the first value and a ΔI signal of a second value for blocking generation of an LOP signal for so long as said LV signal remains at said first value even though said ΔI signal switches to said first value.

* * * * *